United States Patent [19]

Hamilton

[11] Patent Number: 4,962,561
[45] Date of Patent: Oct. 16, 1990

[54] SCRAPING DEVICE

[76] Inventor: Jonathan W. Hamilton, 4646 Liverance, Okemos, Mich. 48864

[21] Appl. No.: 182,168

[22] Filed: Apr. 15, 1988

[51] Int. Cl.$^5$ ............................ B60S 1/04; A47L 1/06
[52] U.S. Cl. ................................ 15/111; 15/143 R; 15/172; 15/236.01; 15/236.02
[58] Field of Search ................ 15/105, 111, 114, 118, 15/236.01, 236.02, 236.05, 143 R, 144 R, 172

[56] References Cited

U.S. PATENT DOCUMENTS

| | | |
|---|---|---|
| 407,517 | 7/1889 | Calef . |
| 712,843 | 11/1902 | Paul . |
| 969,528 | 9/1910 | Disbrow . |
| 1,761,497 | 6/1930 | Smith . |
| 2,482,589 | 9/1949 | Maguire . |
| 2,946,076 | 7/1960 | Morgan ............................ 15/236.02 |
| 4,236,270 | 12/1980 | Mavis ................................. 15/144 R |
| 4,281,433 | 8/1981 | Sendoykas ............................ 15/105 |
| 4,813,458 | 3/1989 | Jacobucci ........................ 15/236.02 |
| 4,888,846 | 12/1989 | Natale ............................. 15/236.01 |

Primary Examiner—Edward L. Roberts
Attorney, Agent, or Firm—Ian C. McLeod

[57] ABSTRACT

A scraping device including a handle with a looped section which engages the upper forearm adjacent the elbow is described. The looped section has a curvature which accommodates a thick winter coat. The device enables the removal of ice and snow from windshields by transmitting the force of the upper forearm to the edge of the scraping device.

12 Claims, 2 Drawing Sheets

SCRAPING DEVICE

BACKGROUND OF THE INVENTION (1) Field of the Invention

The present invention relates to a scraping device for removing ice from vehicle windshields and other surfaces where it is formed. In particular the present invention relates to a scraping device with a handle including a looped section which engages the upper forearm of a user wearing a winter coat while the hand engages the handle means adjacent to the scraper head.

(2) Prior Art

The problem with ice on vehicle windshields and the like is that it is very tenacious. Hand scraping with a conventional ice scraper device directs the force along the axis of the handle and as a result the handle is very difficult to grip and slides in the hand. Generally the prior art scraping devices require two hands for removing the ice with one hand on the handle and the other on the scraper head to force it against the windshield. Various devices have been designed to overcome this problem; however, none have been found to be entirely satisfactory.

U.S. Pat. No. 407,571 to Calef; U.S. Pat. No. 712,843 to Paul; U.S. Pat. No. 1,761,497 to Smith and U.S. Pat. No. 2,482,589 to Maguire show handles which have a looped section which engages the upper forearm of the user. U.S. Pat. No. 969,528 to Disbrow describes a device where the handle engages the wrist area of the user. None of these handles are disclosed as useful for an ice scraper device.

OBJECTS

It is therefore an object of the present invention to provide a scraping device which is easily gripped with one hand to exert pressure on the windshield or a like surface for scraping so that even the most tenacious ice can be removed. Further it is an object of the present invention to provide a device which is simple and economical to construct. These and other objects will become increasingly apparent by reference to the following description and the drawings.

IN THE DRAWINGS

GENERAL DESCRIPTION

The present invention relates to a device for removing ice from vehicle windshields and the like which comprises: a scraper head means with separated ends having an edge at one of the ends which is moved along the windshield to remove the ice and having an attachment means adjacent the other of the ends; and a handle means attached to the attachment means at a proximal end with an arcuate looped section at a distal end, wherein in use the hand of the user grips the handle means adjacent the scraper head means and wherein the looped section has a length and curvature so as to curve around the upper forearm of the user adjacent to the elbow when covered by a winter coat. The loop section can be closed as shown in FIGS. 1 and 2 or open as shown in FIGS. 3 and 4.

SPECIFIC DESCRIPTION

Figure 1:
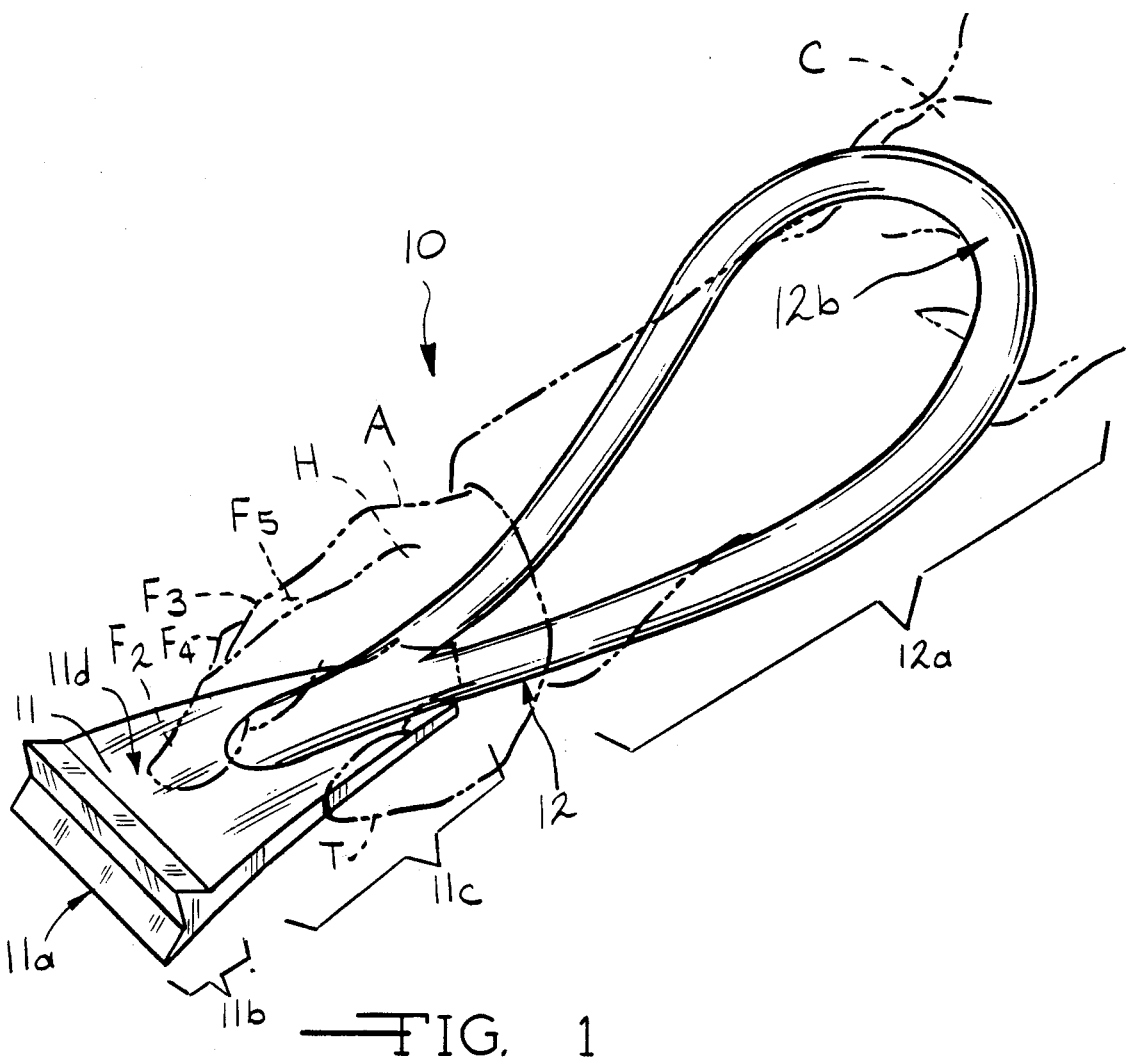
FIG. 1 is a front perspective view of the scraping device of the present invention particularly illustrating a handle with a closed looped section which engages the upper forearm adjacent to the elbow of a user wearing a thick winter coat.
Figure 2:
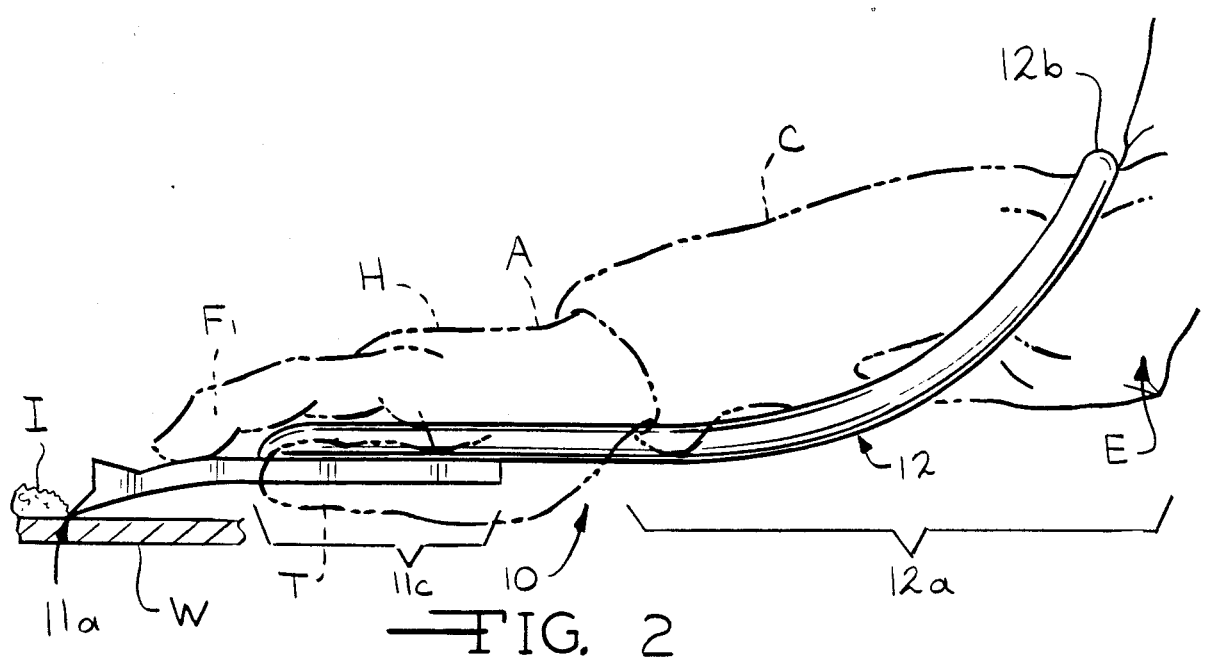
FIG. 2 is a front view of the device shown in FIG. 1.

FIGS. 1 and 2 show one embodiment of the scraping device 10 of the present invention. An arm A covered with a winter coat C, a hand H and a window W are shown so that the use of the device is illustrated. The device 10 includes a scraper head 11 with an edge 11a at one end 11b and a handle 12 with a circular cross-section (not shown) attached to the other end 11c by any convenient means such as solvent welding or fasteners (not shown). The handle 12 is formed with a large closed looped section 12a which curves around the upper arm A outside of the coat C. The top 12b of the looped section 12a is adjacent to the elbow E of the arm A of the user. Thus in use the handle 12 and scraper head 11 are grasped by the hand with the first finger $F_1$ over the top portion 11d of the scraper head 11 and with the thumb T on one side and the remaining fingers $F_2$ to $F_4$ on the other side of the scraper head 11. The result is that there is a substantial downward pressure on the windshield W exerted by the arm A through the handle 12 and hand H so that the ice I is removed.

Figure 3:
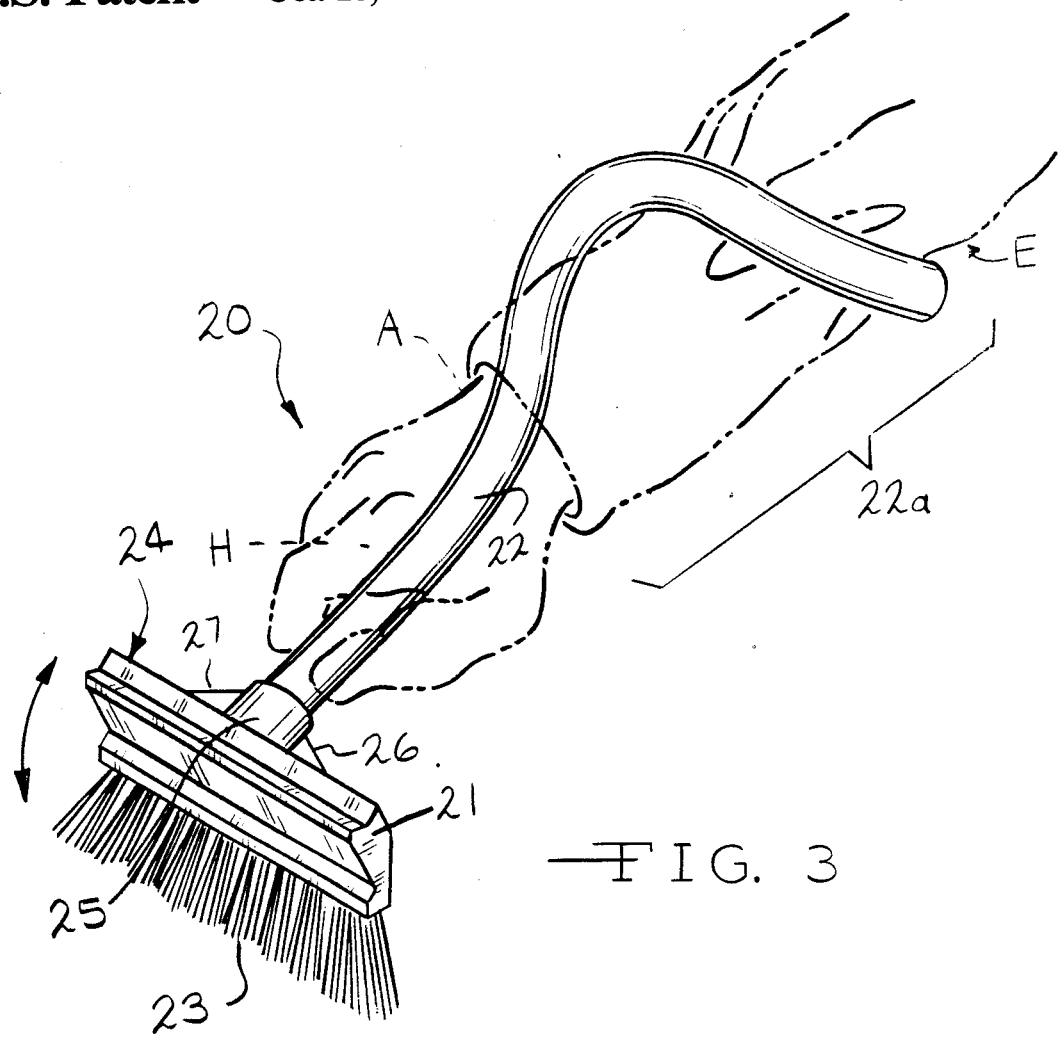
FIG. 3 is a front perspective view of another scraping device showing a handle with an open loop which engages the upper forearm adjacent to the elbow of a user wearing a thick winter coat.
Figure 4:
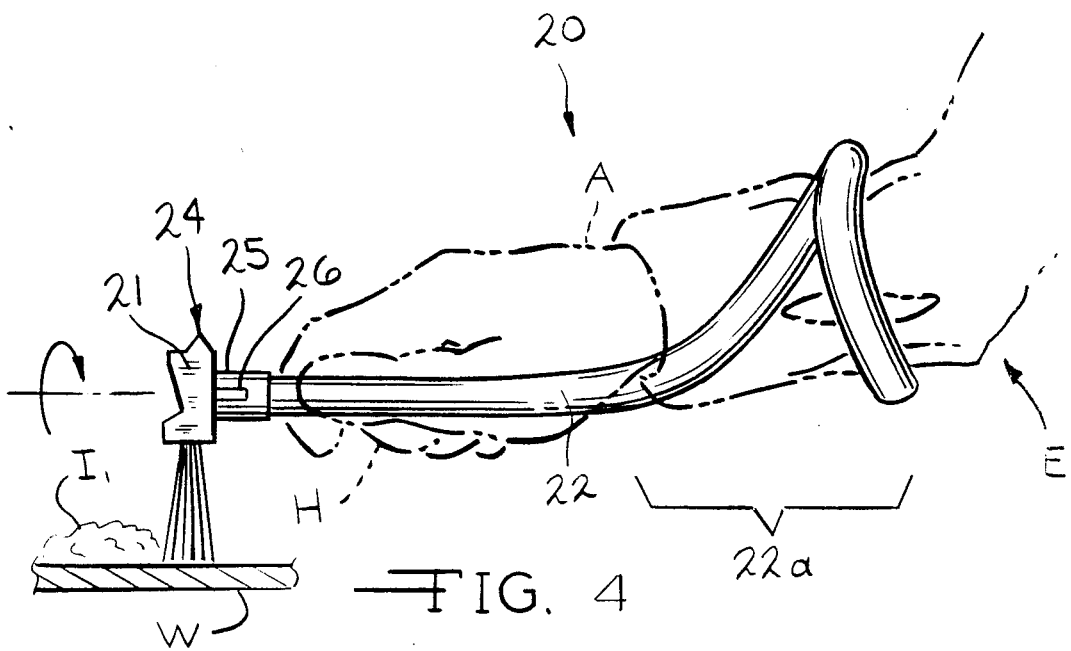
FIG. 4 is a front view of the device shown in FIG. 3.

FIGS. 3 and 4 show a scraper device 20 with a scraper head 21 supported on a handle 22 with a circular cross-section (not shown). The scraper head 21 includes brush bristles 23 and an oppositely positioned scraping edge 24. A socket 25 is provided on the scraper head 21 with gussets 26 and 27 on either side. The handle 22 includes a looped section 22a which is open adjacent to the elbow E of the user so that the section 22 rests on the upper arm A with a coat C interposed between the section 22a and the arm A. The scraper head 21 is rotatable on the handle 22 (as shown by the arrows) so that the brush bristles 23 or edge 24 can be oriented to contact the windshield W. After the edge 24 has been used to loosen the ice I, the brush bristles can brush the loose ice I, away.

It will be appreciated that various known types of scraper heads can be used and are preferably round with a diameter between about 1 and 4 centimeters. Also various handle cross-sections (e.g. square) can be used. Various means can be used to secure the handle on the scraper head and various holding means can be used to secure the rotatable handle in a pre-selected position for scraping or for brushing. All of these variations will be obvious to one skilled in the art.

I claim:

1. A device for removing ice from vehicle windshields and the like which comprises:
   (a) a scraper head means with separated portions having an edge at one of the portions which is moved along the windwhield to remove the ice and having an attachment means adjacent the other of the portions; and
   (b) a handle means attached to the attachment means at a proximal end with an arcuate looped section at a distal end, wherein the use the hand of the user can grip the handle adjacent the scraper head means with the proximal end of the handle means under the wrist and wherein the looped section has a length and curvature so as to curve from under the forearm of the user to around the upper forearm of the user adjacent to the elbow when covered by a winter coat.

2. The device of claim 1 wherein the looped section of the handle means is closed.

3. The device of claim 1 wherein the looped section of the handle means is open with a connection to the attachment means at the proximal end of the handle means and the looped section terminating adjacent the upper forearm at the distal end of the handle means.

4. The device of claim 1 wherein the handle means has a round cross-section.

5. The device of claim 4 wherein the handle means has a diameter between about 1 and 4 cm.

6. The device of claim 1 wherein the scraper head means is rigidly connected to the handle means.

7. A device for removing ice from vehicle windshields and the like which comprises:
 (a) a scraper head means with separated portions having an edge at one of the portions which is moved along the windshield to remove the ice and having an attachment means adjacent the other of the portions wherein the scraper head means is provided with a second implement means and is rotatable on a handle means at the attachment means so that the edge can be moved into and out of an orientation to scrape ice from the windshield and so that the second implement means on the scraper means can be positioned for movement over the windshield; and
 (b) a handle means rotatably attached to the attachment means at a proximal end with an arcuate looped section at a distal end, wherein in use the hand of the user grips the handle adjacent the scraper head means and wherein the looped section has a length and curvature so as to curve around the upper forearm of the user adjacent to the elbow when covered by a winter coat.

8. The device of claim 7 wherein the second implement means is a brush.

9. The device of claim 7 wherein the looped section of the handle means is closed.

10. The device of claim 7 wherein the looped section of the handle means is open with a connection to the attachment means at the proximal end of the handle means and the looped section terminating adjacent the upper forearm at the distal end of the handle means.

11. The device of claim 7 wherein the handle means has a round cross-section.

12. The device of claim 11 wherein the handle means has a diameter between about 1 and 4 cm.

* * * * *

UNITED STATES PATENT AND TRADEMARK OFFICE
CERTIFICATE OF CORRECTION

PATENT NO. : 4,962,561
DATED : October 16, 1990
INVENTOR(S) : Jonathan W. Hamilton It is certified that error appears in the above—identified patent and that said Letters Patent is hereby corrected as shown below:

TITLA PAGE: the inventor's address should be --1024 Cooper, Lansing, Michigan  48910--.

under "U.S. Patent Documents", "407,517" should be --407,571--.

Column 2, line 63, "the" before "use" should be --in--.

Signed and Sealed this

Second Day of June, 1992

*Attest:*

DOUGLAS B. COMER

*Attesting Officer*     Acting Commissioner of Patents and Trademarks